(12) United States Patent
Garrett et al.

(10) Patent No.: US 8,314,702 B2
(45) Date of Patent: Nov. 20, 2012

(54) METHODS AND SYSTEMS FOR ACTIVATING A PROXIMITY INFORMATION DEVICE

(75) Inventors: Duncan Garrett, Islington London (GB); David Anthony Roberts, Warrington (GB); Colin Tanner, Middlesex (GB)

(73) Assignee: MasterCard International, Inc., Purchase, NY (US)

( * ) Notice: Subject to any disclaimer, the term of this patent is extended or adjusted under 35 U.S.C. 154(b) by 983 days.

(21) Appl. No.: 12/352,794

(22) Filed: Jan. 13, 2009

(65) Prior Publication Data

US 2010/0176948 A1    Jul. 15, 2010

(51) Int. Cl.
G08B 13/14    (2006.01)
(52) U.S. Cl. ............... 340/572.1; 340/572.7; 340/10.1; 340/10.5; 340/928; 343/860; 343/822
(58) Field of Classification Search .............. 340/572.1, 340/572.7, 10.1, 10.5, 928; 343/860, 822
See application file for complete search history.

(56) References Cited

U.S. PATENT DOCUMENTS

| | | | | |
|---|---|---|---|---|
| 5,701,127 A * | 12/1997 | Sharpe | ........................ | 340/10.2 |
| 6,356,207 B1 * | 3/2002 | Oouchi | ........................ | 340/928 |
| 6,400,271 B1 * | 6/2002 | Davies et al. | ............. | 340/572.1 |
| 6,572,015 B1 * | 6/2003 | Norton | ........................ | 235/382 |
| 6,749,117 B2 * | 6/2004 | Nakabe et al. | ................ | 235/435 |
| 6,840,455 B2 * | 1/2005 | Norton | ........................ | 235/492 |
| 7,023,817 B2 * | 4/2006 | Kuffner et al. | ................ | 370/324 |
| 7,042,353 B2 * | 5/2006 | Stilp | ........................ | 340/539.22 |
| 7,242,304 B2 * | 7/2007 | Clancy et al. | ............... | 340/572.9 |
| 7,262,711 B2 * | 8/2007 | Zhu et al. | ........................ | 340/928 |
| 7,356,495 B2 * | 4/2008 | Beigl et al. | ........................ | 705/28 |
| 7,474,211 B2 * | 1/2009 | Kramer | ........................ | 340/572.1 |
| 2001/0024157 A1 * | 9/2001 | Hansmann et al. | ........ | 340/10.41 |
| 2002/0070862 A1 * | 6/2002 | Francis et al. | ............. | 340/572.1 |
| 2003/0071717 A1 * | 4/2003 | Hagl et al. | ................ | 340/5.61 |
| 2004/0182926 A1 * | 9/2004 | Nakabe et al. | ................ | 235/435 |
| 2005/0190060 A1 * | 9/2005 | Clancy et al. | ............... | 340/572.9 |
| 2005/0248438 A1 * | 11/2005 | Hughes et al. | ................ | 340/10.4 |
| 2005/0285739 A1 * | 12/2005 | Velhal et al. | ................ | 340/572.1 |
| 2006/0049947 A1 * | 3/2006 | Forster | ........................ | 340/572.3 |
| 2006/0082470 A1 * | 4/2006 | Zhu et al. | ........................ | 340/928 |
| 2006/0187046 A1 * | 8/2006 | Kramer | ........................ | 340/572.3 |
| 2006/0273902 A1 * | 12/2006 | Shafer et al. | ................ | 340/572.1 |
| 2007/0018832 A1 * | 1/2007 | Beigel et al. | ................ | 340/572.7 |
| 2007/0139290 A1 * | 6/2007 | Song et al. | ........................ | 343/860 |
| 2007/0183271 A1 * | 8/2007 | Ashizaki et al. | ................ | 369/14 |
| 2008/0084276 A1 * | 4/2008 | Bauchot et al. | ............. | 340/10.1 |
| 2008/0238617 A1 * | 10/2008 | Kuhl et al. | ................ | 340/10.1 |
| 2009/0050686 A1 * | 2/2009 | Kon et al. | ........................ | 235/375 |
| 2009/0152353 A1 * | 6/2009 | Tsirline et al. | ................ | 235/439 |
| 2010/0265038 A1 * | 10/2010 | Beenau et al. | ............... | 340/5.83 |
| 2012/0056718 A1 * | 3/2012 | Leutgeb et al. | ............. | 340/10.1 |

* cited by examiner

*Primary Examiner* — Hoi Lau
(74) *Attorney, Agent, or Firm* — Buckley, Maschoff & Talwalkar LLC

(57) ABSTRACT

A proximity information device includes a body, a radio frequency identification (RFID) integrated circuit (IC) supported by the body, and a threshold detector coupled to the RFID IC. The RFID IC is operative to transmit a response message in response to an interrogation signal if the threshold detector indicates that a detected magnetic and electric field and the relative strength of magnetic field compared to the electric field satisfy a predetermined threshold.

17 Claims, 4 Drawing Sheets

METHODS AND SYSTEMS FOR ACTIVATING A PROXIMITY INFORMATION DEVICE

BACKGROUND

Proximity information devices, such as proximity (or "contactless") payment devices, cards or keyfobs, are becoming increasingly common. Proximity information devices commonly use a magnetic field (generated by a point of sale terminal, for example) to activate a proximity device. Once activated, information and data may be transmitted between the proximity device and the point of sale terminal.

One concern that has been raised about these devices is that it may be possible for unauthorized persons to surreptitiously read private information from proximity information devices by activating the proximity device from a greater distance than normally achieved with a conventional reader. For example, an unauthorized person may carry or set up a device that uses greater transmitter power than permitted for such devices and other refinements to increase operational range. It is widely understood that given sufficient resources, a device can be constructed that is capable of communicating with a proximity information device over a distance of up to 1 meter. It has been reported by some that devices have been constructed that allow communication at a distance of up to 10 meters.

An unauthorized person may use such a device in an attempt to capture the payment card information from proximity payment cardholders in a busy environment. While other security techniques prevent these attacks from using the financial data from the cards, many users are concerned about the privacy issues associated with such attacks. Similar concerns exist for other types of proximity information devices such as contactless drivers licenses, medical cards, identification cards and passports.

A number of proposals have been made to provide a user-actuated switch on proximity information devices so that the device may be carried in an unactivated state until the device is to be used to conduct a transaction.

A possible disadvantage of proposed designs for a proximity information device having a user-actuatable switch is that the manufacturing cost of the device may be increased by incorporating a switch in the device. Also, some users may prefer not to have to actuate a switch while presenting their proximity information device for reading.

DETAILED DESCRIPTION

Figure 1:
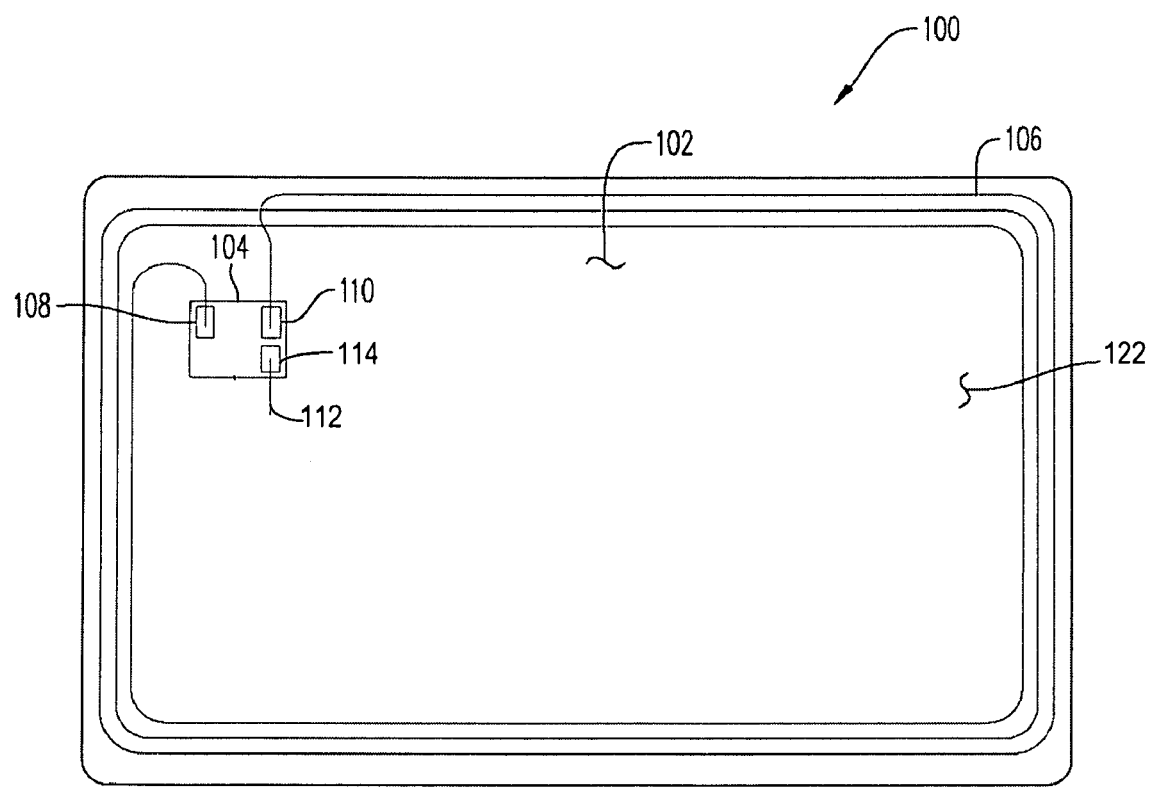
FIG. 1 is a schematic plan view of a proximity information device according to some embodiments.

In general, and for the purpose of introducing concepts of embodiments of the present invention, a proximity information device includes an RFID IC coupled to a first antenna used to detect a magnetic field and to activate the RFID IC and a second antenna used to detect an electric field when the card is proximate a card reader or other device attempting to communicate with the RFID IC. Pursuant to some embodiments, the RFID IC is activated, and responds to the device attempting to communicate with it, only if the absolute levels of, or the relationship between the measured electric and magnetic fields are greater than a predetermined minimum, or within pre-determined limits. For example, the predetermined minimum may be set to ensure that the RFID IC is only activated when the proximity information device is within a certain predetermined distance from a reader. In this way, the proximity information device may be protected from surreptitious reading and is only activated when the device is proximate a reader.

A number of terms are used herein. For example, the term "proximity information device" is used to refer to devices such as information-carrying devices that are compliant with ISO/IEC 14443 Standard, ISO/IEC 18000 standard, or the NFC standards including ISO/IEC 18092/ECMA 340 and ISO/IEC 21481/ECMA 352. As a particular example, a "proximity payment device" may be further compliant with both the ISO/IEC 14443 Standard and the "PayPass" standards promulgated by MasterCard International Incorporated. Other contactless devices may also benefit from embodiments of the present invention, particularly where the contactless device is of a type that is activated when a radio frequency chip on the device is activated by a magnetic field. As another specific example, embodiments of the present invention may be used to selectively control activation of proximity information devices containing other types of personal data (other than payment data), such as contactless driver's licenses, contactless passports, medical information cards, training cards, or the like. As a result, the term "proximity information device" is used to refer to both proximity payment devices used for payment transactions (such as PayPass payment devices) as well as devices used for storage of other personal information (such as driver's licenses, passports, or the like). To illustrate features of the present invention, a proximity payment device will be described. Those skilled in the art will appreciate, upon reading the present disclosure, that similar techniques may be used for other proximity information devices.

As used herein, the term "reader" or "point of sale terminal" is used to refer to a terminal that has a proximity coupling device to interrogate and read data from proximity information devices. For simplicity and ease of exposition, the readers discussed herein are readers used to interrogate and read data from proximity payment devices, although features of the present invention may be used with other types of readers, including driver's license readers, medical card readers, identification card readers and passport readers, etc.

FIG. 1 is a schematic plan view of a proximity payment device 100 according to some embodiments. In the embodiment shown, the proximity payment device 100 has a body 102, which may resemble conventional payment cards in shape and size. The body 102 may be formed of plastic or another suitable material. Embodiments of the present invention may be shaped or formed in any of a number of ways, and need not be formed in the shape of a card. For example, embodiments of the present invention may be shaped or formed as key fobs, embedded in mobile telephones, or in any other form factor so long as the components described below are provided in the device.

The proximity payment device 100, no matter the form or shape of the carrier, includes an RFID IC 104. The RFID IC 104 may be mounted and/or installed in any suitable manner in the body 102. For example, the RFID IC 104 may be embedded (partially or completely) in the body 102. The RFID IC 104 may be suitably designed and configured to transmit payment card account information (or other personal information) by radio frequency signaling to a POS terminal or other reader. In some embodiments, including the illustrative embodiment to be discussed herein, the RFID IC 104 may be designed and configured to operate in accordance with the "PayPass" standard promulgated by MasterCard International Incorporated, the assignee hereof.

The proximity payment device 100 may further include an antenna 106 embedded in or otherwise mounted on the body 102. As shown, the antenna 106 may be in the form of several loops arranged along the periphery of the body 102. Alternatively, the antenna 106 may be of a different type and/or configuration. The antenna may be operative generally in accordance with the above-mentioned PayPass standard to receive interrogation and power signals (which may be the same signal) from a proximity coupling device of a POS terminal and to transmit payment card account number information and/or other information to the proximity coupling device. The antenna 106 may be coupled to the RFID IC 104 via terminals 108, 110, each coupled to a respective end of the antenna 106.

In accordance with embodiments of the invention, the proximity payment device 100 includes a second antenna 112 that is coupled to the RFID 104 In the particular example embodiment illustrated in FIG. 1, the second antenna 112 is a short conductive stub that is coupled to a pad or terminal of the RFID IC 104, although other coupling arrangements may alternatively be employed. The second antenna 112 may be any type of antenna that is coupled to allow the RFID IC to sense the relative levels of voltage across the antenna 112. Antenna 112 is therefore functioning as an electric field (or "E field") probe as opposed to the main antenna 106 that functions as a magnetic field (or "H field") probe. The chip may therefore detect either the absolute level of both signals or compute the relative level of the E and H fields.

In some embodiments, additional circuitry is implemented on the RFID IC 104 (or in communication with the RFID IC) to detect and measure the magnetic and electric fields at antenna 106 and second antenna 112. Pursuant to some embodiments, the additional circuitry (described below in conjunction with FIG. 2) acts to permit or deny activation of the RFID IC 104, such that the RFID IC 104 will only transmit information to a reader when the proximity device is sufficiently near the reader. In this manner, embodiments prevent unintended activation and transmission of private data from proximity information devices.

In some embodiments, lettering (not shown in FIG. 1) or other symbols (not shown in FIG. 1) may be present on the front surface 122 of the body 102 and/or on the rear surface (not shown) of the body 102. The proximity payment device 100 may have one or more magnetic stripes (not shown) on the body 102 to allow the proximity payment device 100 to be read by a magnetic card reader. In addition, or alternatively, there may be embossed numbers and/or letters on the card-shaped body to indicate one or more account numbers and/or the name of the holder of the proximity payment device 100. In addition, or alternatively, non-embossed printing on the front surface 122 may indicate the account numbers and/or the holder's name. Still further, the front surface 122 of the body 102 may carry one or more logos and/or brands, including for example the brand/logo of an international payment card association such as MasterCard International Incorporated. The brand/logo of the issuer may also be present, as well as, for example, a specific card product brand. Other conventional features that may be present on the proximity payment device 100 (though such features are not shown) are an adhesive paper strip to receive the signature of the cardholders and a security code or the like printed on the adhesive strip.

As discussed above, embodiments of the present invention may be used with any of a number of types and shapes of proximity information device. The above example, relating to a particular embodiment of proximity payment device, is provided as illustration only. Those skilled in the art will recognize that proximity information devices may be configured as keyfobs, tokens, or any of a number of different configurations.

Figure 2:
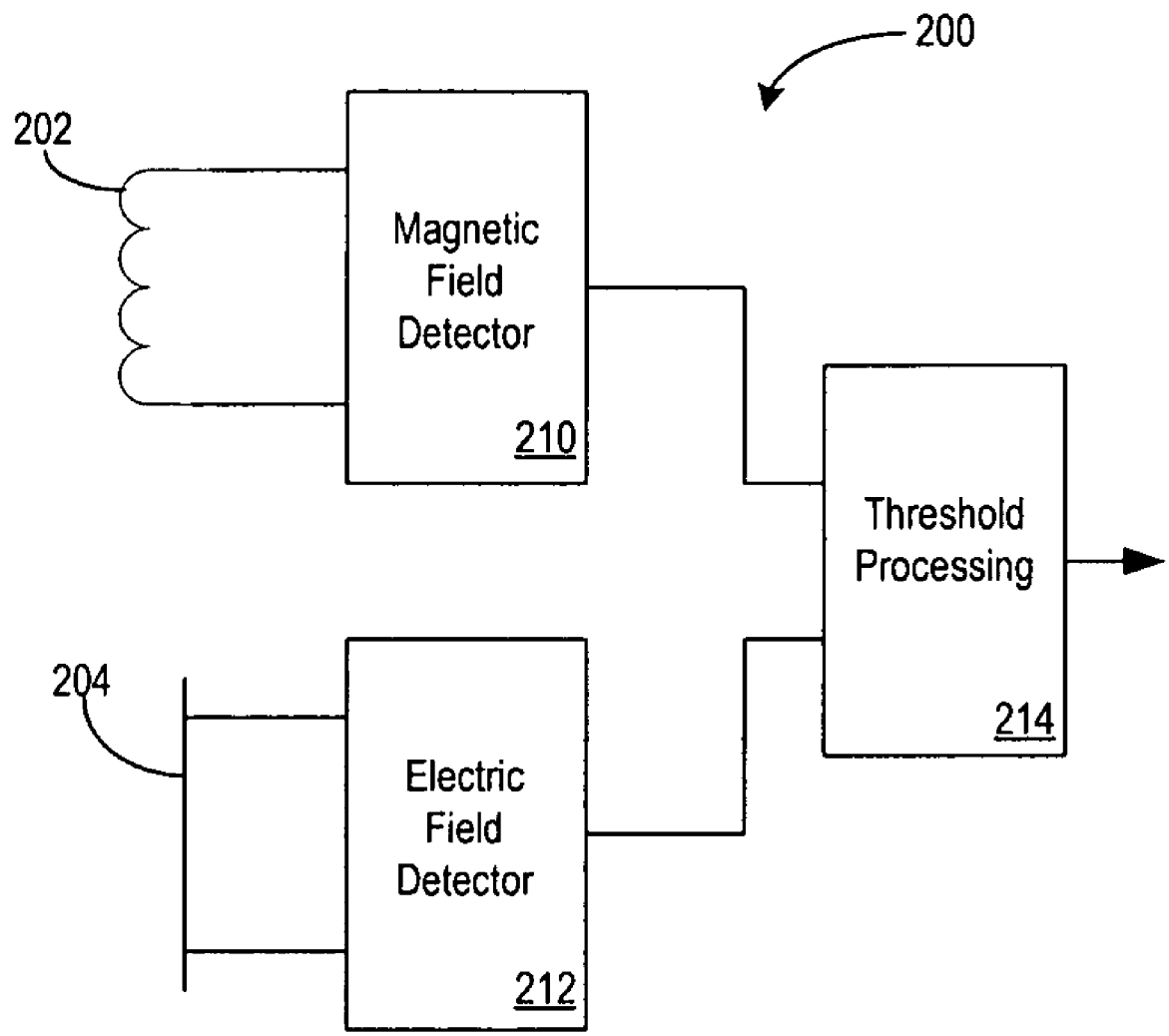
FIG. 2 is a schematic plan view of a portion of a circuit of a radio frequency identification (RFID) integrated circuit (IC) that is included in the proximity information device of FIG. 1.

FIG. 2 is a block diagram depicting certain components of a control circuit 200 pursuant to some embodiments of the present invention. Control circuit 200 may be formed as a part of the RFID IC 104 and is powered in the same manner as the RFID IC 104 (e.g., the control circuit 200 is powered by rectifying a received interrogation signal to generate a DC power input signal). Control circuit 200 has a magnetic field detector 210 and an electric field detector 212 which provide inputs to a threshold processing device 214. Magnetic field detector 210 is coupled to one or more antennas 202 (such as the antennas 106 of FIG. 1). As is common in proximity devices, the antennas 202 are responsive to signals received from interrogation devices (such as point of sale terminals or other readers) and produce an alternating current output voltage signal that is proportional to the field strength of the received signals. In existing proximity devices, the output voltage signal produced by exciting the antennas is used to power and communicate with the RFID IC 104. Pursuant to embodiments of the present invention, the output voltage signal is still used in a traditional fashion; however, the signal is also used as an input to magnetic field detector 210.

Magnetic field detector 210 produces an output voltage signal (which, in some embodiments, is independent of frequency, and does not degrade the signal that is used to power and as an input to the RFID IC 104) that is input to a threshold processing circuit 214. The use of this input signal (representing a relative strength of the detected magnetic field) by the threshold processing circuit will be described further below.

Electric field detector 212 is coupled to a second antenna 204 (such as the antenna 112 of FIG. 1) and is used to detect a level of voltage across the second antenna 204. The relative voltage generated across the second antenna 204 is provided as a second input to the threshold processing circuit 214. In some embodiments, the second antenna 204 may be formed as a pair of conductive layers formed in the substrate of the RFID IC 104 with a known dielectric material disposed between the layers so that relative voltage difference between the two layers may be measured. In some embodiments, the second antenna 204 may be formed as an unterminated stub of wire either on or off the chip. Alternatively it could be any similar E field probe of a type generally used in the industry to measure electric fields.

Threshold processing circuit 214 receives the two input signals (the signal from the magnetic field detector 210 and the signal from the electric field detector 212) and determines, based on the relative magnitude of the two signals, whether the RFID IC 104 should be activated such that information from the RFID IC 104 can safely be transmitted to a reader. Alternatively (or in addition), threshold processing circuit 214 may compute the ratio between the two signals and determine, based on the computed ratio, whether IC 104 should be activated (or, whether the IC 104 should respond to the interrogation signal).

Pursuant to some embodiments, threshold processing circuit 214 operates on the received inputs to determine if the detected electronic and magnetic fields indicate that the proximity device is sufficiently near a reader. Put another way, the threshold processing circuit 214 is configured to determine if it is more likely that a user has intentionally placed the proximity device near a reader than a user has unintentionally (or unknowingly) come into range of a reader (such as when an unauthorized party has attempted to surreptitiously activate the card and read the private information from it). Pursuant to some embodiments, the detected electronic and magnetic fields have relative magnitudes which depend on the distance between the antennas and the reader emitting the detected signal.

In general, a reader configured to interact with a proximity device generates an electromagnetic field with a very high magnetic content and a low electric field content when the reader is near the proximity device. This is because proximity devices are tuned and configured to use magnetic coupling, and the cards are tuned to be activated with relatively low signal strengths (as higher strengths would interfere with other proximity devices). This is achieved, in part, by using antennas (such as antennas 106) which have a low radiation resistance. Proximity devices have a further property where the physical proximity effects of the antennas 106 diminish as the proximity device is placed further from the electromagnetic source (e.g., the reader). As the distance increases, the free space relative levels of the electric field and the magnetic field reimpose themselves. That is, as a proximity device is moved further from a reader, the relative levels of electric and magnetic fields change. Embodiments provide a threshold processing circuit 214 which monitors these relative levels, and determines if the relative levels are within a predetermined threshold indicating that the proximity device is sufficiently near a reader to suggest that the cardholder intended for the proximity device to be activated.

Pursuant to some embodiments, threshold processing circuit 214 utilizes a look-up table which includes expected values of the measured electric and magnetic field strength at different distances and/or a simple threshold for the ratio of E/M (shown in the table below as the column labeled "Relationship E/M"). For example, a particular proximity device may be known to display the following general characteristics when placed the below-noted distance from a reader:

| Distance (CM) | Magnetic Field (V) | Electric Field (mV) | Relationship (E/M) |
| --- | --- | --- | --- |
| 0.5 | 10.87 | 75 | 6.9 |
| 1 | 8.6 | 59 | 6.8 |
| 2 | 5.87 | 51 | 8.6 |
| 3 | 3.94 | 43 | 10.9 |
| 4 | 2.77 | 37 | 13.4 |
| 10 | 0.55 | 17.5 | 31.8 |

In the above table, the magnetic field is the voltage detected across a standard ID-1 calibration coil and the electric field is the voltage detected in millivolts at the end of a 2 cm wire stub into a 50 ohm receiver.

Continuing the example, threshold processing circuit 214 may include a threshold where the measure of the detected magnetic field must be greater than 5.87 V and the measure of the detected electric field must be greater than 51 mV for the RFID IC 104 to be activated and allowed to communicate with a reader. Any values less than the threshold may indicate that the device holder did not intend for the card to be activated. In this manner, proximity devices, such as proximity payment cards, may be activated only when the device is tapped or placed near a reader. Alternatively a threshold on the E/M relationship may be set, such as a ratio of 14 (with the magnetic field of about 2.5 V, and the electric field of about 35 mV) in the above example, to prohibit devices reading beyond about 4 cm.

Figure 3:
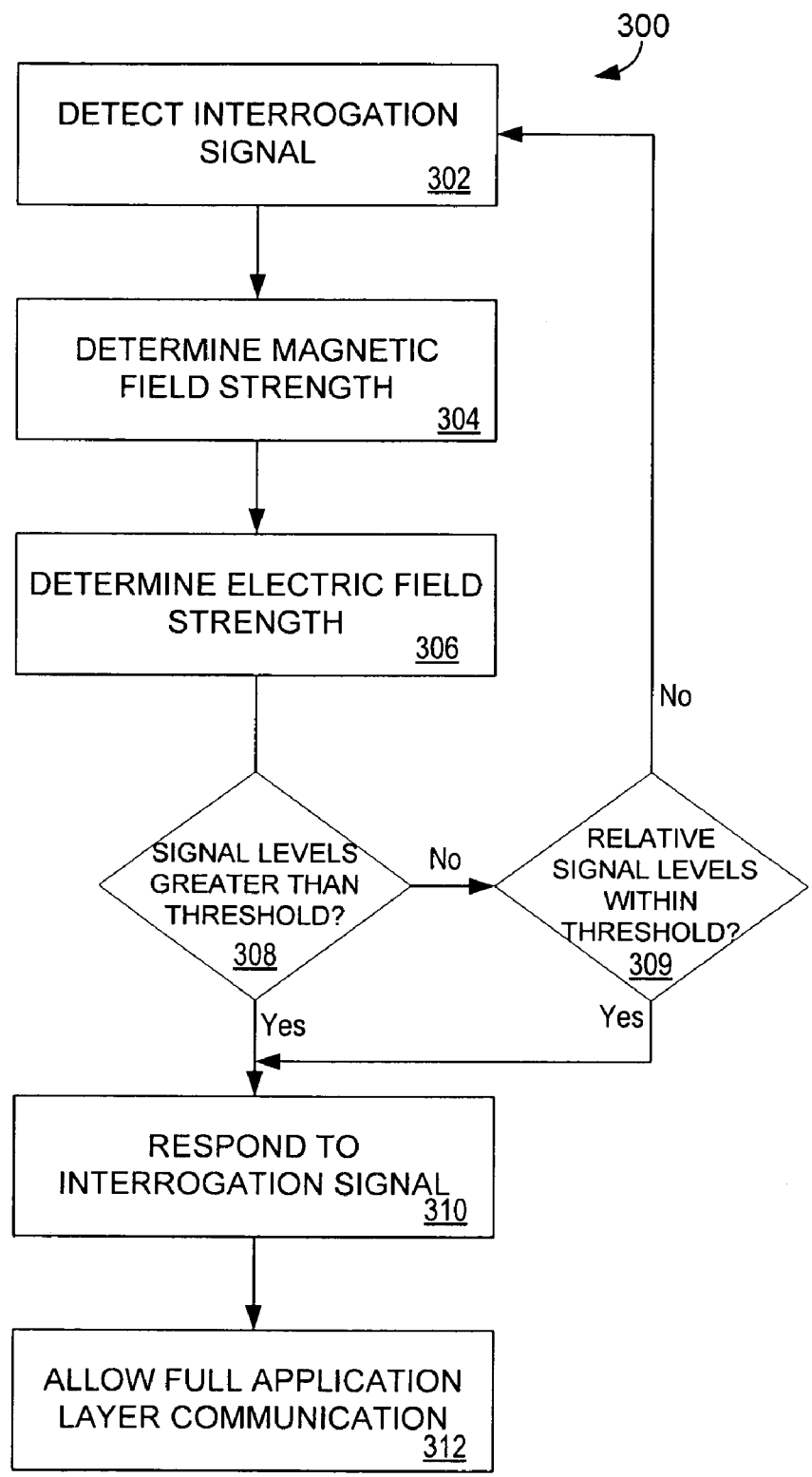
FIG. 3 is a flow chart that illustrates a process that may be performed by the circuit of FIG. 2 that is included in the proximity information device of FIG. 1.

FIG. 3 is a flow chart that illustrates a process 300 that may be performed by the control circuit 200 in conjunction with the RFID IC 104 pursuant to some embodiments. In some embodiments, process 300 may be performed each time a proximity information device (such as the proximity payment device 100 of FIG. 1) receives an interrogation signal attempting to initiate communication between a reader of some type and the RFID IC 104 (e.g., the process 300 may be performed when a proximity device is near a valid reader, as well as when the proximity device is near, or responsive to, an unauthorized reader). Pursuant to some embodiments, process 300 is controlled by control circuit 200 operating in conjunction with RFID IC 104.

Process 300 begins at 302 where the RFID IC 104 detects an interrogation signal. For example, the interrogation signal is received by antenna 106 from a reader or other device which emits an electromagnetic field of sufficient strength to excite the antenna 106 and cause the RFID IC 104 to be powered-up. As is known in the art, proximity devices rectify a received interrogation signal to generate a DC power level of sufficient magnitude to power-up the RFID IC 104 and the control circuit 200). Processing at 302 includes receiving an electromagnetic field of sufficient magnitude to power-up the RFID IC 104.

Processing continues at 304 where the magnitude of the magnetic field at the proximity device is measured. For example, pursuant to some embodiments, processing at 304 includes detecting a peak to peak voltage across a calibration coil (e.g., such as one of the winds of antenna 106). The detection and measurement of the magnitude of the magnetic field may be determined, for example, by a circuit such as the magnetic field detector 210 of FIG. 2.

Processing continues at 306 where the electric field strength is determined. For example, pursuant to some embodiments, processing at 306 includes detecting the levels of voltage across the second antenna 112. Pursuant to some embodiments, the level of voltage across the second antenna 112 is determined by measuring a peak to peak voltage across the second antenna 112, where the second antenna 112 has known characteristics (e.g., such as a known resistance).

In some embodiments, process 300 may include two determinations: a first determination (at 308) whether the detected E and M field signals are greater than a predetermined threshold (e.g., to limit the range the device can operate from a reader), and a second determination (at 309) whether a comparison between the E and M fields is within a predetermined threshold (e.g., using the measured ratio of the E and M fields to determine whether it is likely that a high powered, but distant, reader is being used). Process 300 is shown as using both of these determinations. Those skilled in the art will recognize that readers and devices configured pursuant to some embodiments may use one or the other (or both) of the determinations at 308 and 309 to prevent unauthorized access to RFID ICs 104.

Continuing the reference to FIG. 3, processing continues at 308 where a determination is made whether the measured electric and magnetic fields are sufficiently strong to indicate that the proximity device is near a reader. In some embodiments, processing at 308 includes processing by a circuit such as threshold processing circuit 214 of FIG. 2. In some embodiments, a look-up table having known voltage levels and distances is used. The look-up table may specify threshold values (such as the minimum detected magnetic field and the minimum detected electric field) for a reader to be considered legitimate.

If the determination at 308 indicates that the magnetic and electric field strengths exceed the thresholds, processing continues at 310 where the RFID IC 104 is activated or otherwise enabled to allow the IC to respond to the interrogation signal received at 302. Processing continues at 312 where the RFID IC 104 is placed in a condition in which it is allowed full application layer communication (e.g., in embodiments involving payment devices, the RFID IC 104 may be permitted to transmit a response message to the reader including a payment account number where the proximity device is a proximity payment device configured to operate pursuant to the PayPass standards).

In situations where processing at 308 indicates that the detected magnetic and electric field strengths are below the thresholds, processing may continue at 309 where a further determination is made whether the relative signal levels of the E and M fields are within a threshold. For example, processing at 309 may include determining if the ratio of the E to M fields is within a predetermined ratio. If processing at 309 indicates that the ratio of the E to M fields is greater than a predetermined threshold, processing may revert to 302 where the RFID IC 104 is placed in a "wait" condition (awaiting a further interrogation signal). That is, in embodiments where two determinations (at 308 and 309) fail, the RFID IC 104 is not permitted to respond to the interrogation signal, as it is likely that the interrogation signal is from a remote (and possibly unauthorized) reader.

If processing at 309 indicates that the ratio of the E to M fields is within a predetermined threshold, processing may continue at 310 where the RFID IC 104 is permitted to respond to the interrogation signal (as discussed above).

Figure 4:
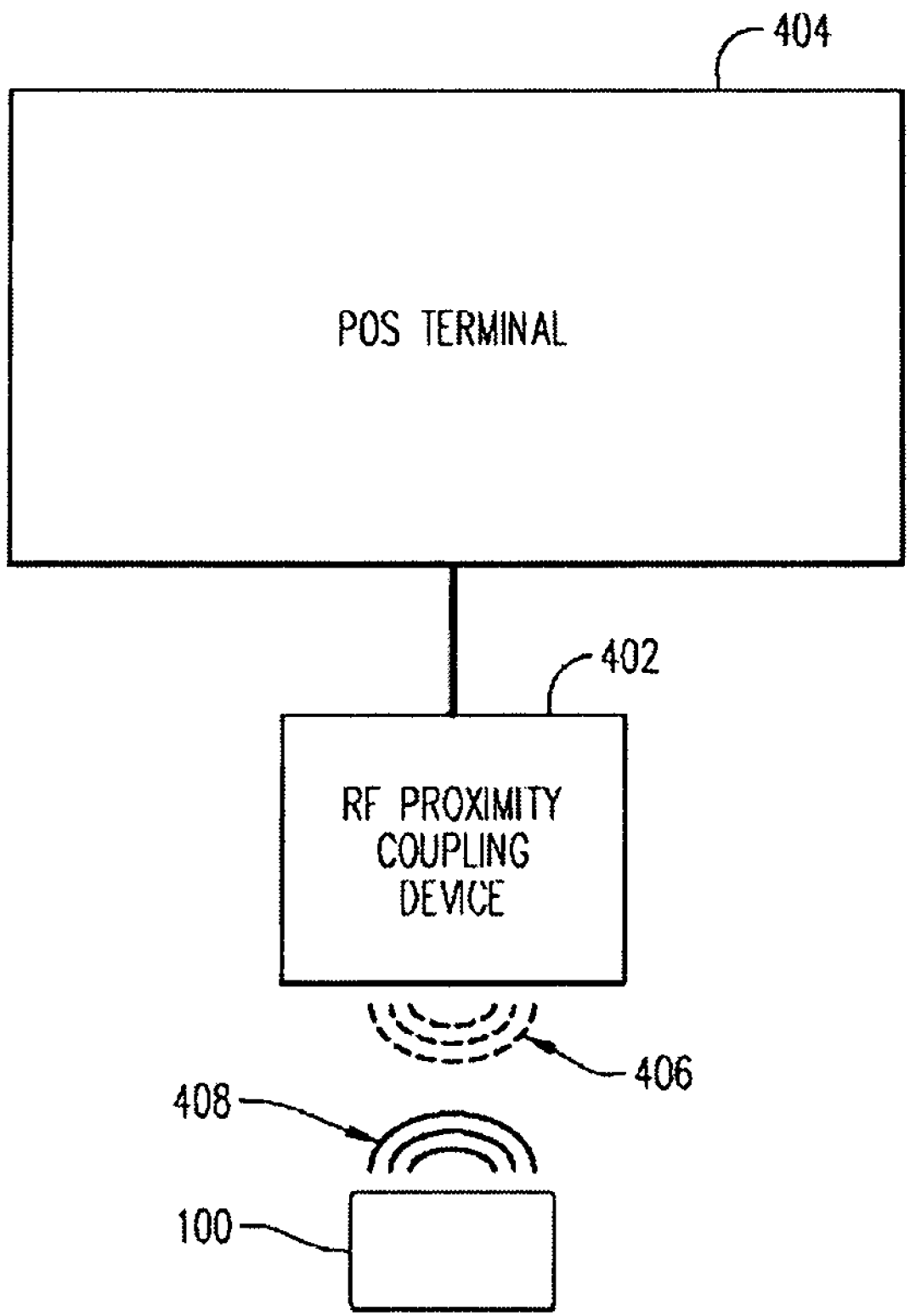
FIG. 4 is a block diagram representation that illustrates use of a proximity payment device according to aspects of the present invention.

FIG. 4 is a block diagram representation that illustrates use of a proximity payment device (such as the device 100 of FIG. 1) according to aspects of the present invention. In operation, the user presents the proximity payment device 100 to a proximity coupling device 402 (or a "reader") which is connected to, or in communication with, a point of sale terminal 404. The proximity coupling device 402 transmits an interrogation signal 406 consisting of an electromagnetic field with a high magnetic content and a low electric content. The proximity payment device 100 receives the interrogation signal via the antenna 106 (FIG. 1), causing the RFID IC 104 to be powered-up (as described in the process of FIG. 3) by rectifying the received interrogation signal to generate a DC power level.

Pursuant to embodiments of the present invention, the RFID IC 104 responds to the interrogation signal only if the interrogation signal has magnetic and electric components or their ratio that satisfy a predetermined threshold indicating that the device 100 is sufficiently near the reader 402. If so, then the RFID IC 104 may transmit a signal to proximity coupling device 402 in response to the interrogation signal 406. The signal transmitted by the RFID IC 104 may include a payment card account number that was previously stored in the RFID IC 104 and/or other information required for interaction with the proximity coupling device 402. The RFID IC 104 may transmit the signal (and possibly one or more additional signals) to the proximity coupling device 402 via the card's antenna 106.

If the RFID IC 104 determines that the signal received from the reader 402 does not meet the predetermined threshold, then the RFID IC 104 may idle without responding to the interrogation signal. In this manner, if the proximity payment device were being subjected to an attack in which the device, while in the cardholder's wallet or hand bag, was being surreptitiously interrogated by a malefactor, the card would not respond to the interrogation signal since the interrogation signal would likely not pass the threshold.

Embodiments of some aspects of the invention have heretofore been described with reference to a card-shaped proximity payment device, but the teachings disclosed herein are also applicable to proximity payment devices which are not card-shaped as well as other proximity information devices.

Although not indicated in the drawings, one or more of the proximity information devices may have a contact interface like that of a conventional smart card that includes a contact interface.

The principles taught herein have heretofore generally been described in the context of proximity payment devices. Nevertheless, these teachings are also applicable to cards or the like issued by transportation systems (e.g., mass transit systems) for access to the transportation systems; to cards used to identify the holder for purposes apart from or in addition to transaction payments; to so-called electronic passports (also known as RFID-enabled passports), to medical cards or medical information cards or devices (used to store information regarding a holder's medical history or other health-related information), and to other cards or devices such as training cards (used to store information regarding a holder's training received and qualifications or certifications to undertake particular jobs).

As used herein and in the appended claims the term "identification token" refers to card, device or other object that serves as one or more of a proximity payment device, a transportation card, an identification card, a medical card, a training card and/or an RFID-enabled passport. The term "transportation card" refers to a card or similar device used to pay, or confirm or evidence payment of, a charge for using a transportation system. The term "RFID-enabled passport" refers to an internationally recognized travel document that includes an IC and an antenna and communicates with a terminal by a wireless communication technique.

The above description and/or the accompanying drawings are not meant to imply a fixed order or sequence of steps for any process referred to herein; rather any process may be preformed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A proximity information device comprising:
   a body;
   a radio frequency identification (RFID) integrated circuit (IC) supported by the body; and
   a threshold detector coupled to the RFID IC;
   wherein the RFID IC is operative to transmit a response message in response to an interrogation signal only if the threshold detector indicates that a detected magnetic and electric field satisfy a predetermined threshold comprising a ratio of the detected electric field to the detected magnetic field.

2. The proximity information device of claim 1, wherein the threshold detector is coupled to a magnetic field detector and receives a signal representing the magnitude of a magnetic field detected by said magnetic field detector.

3. The proximity information device of claim 1, wherein the threshold detector is coupled to an electric field detector and receives a signal representing the magnitude of an electric field detected by said electric field detector.

4. A proximity information device comprising:
a body;
a radio frequency identification (RFID) integrated circuit (IC) supported by the body; and
a threshold detector coupled to the RFID IC;
wherein the RFID IC is operative to transmit a response message in response to an interrogation signal only if the threshold detector indicates that a detected magnetic and electric field satisfy a predetermined threshold, wherein said predetermined threshold comprises:
a first predetermined threshold identifying a satisfactory ratio of said detected electric field to said detected magnetic field; and
a second predetermined threshold identifying a satisfactory value of said detected magnetic field and a satisfactory value of said detected electric field.

5. The proximity information device of claim 1, wherein the proximity information device is a payment device, and the response message includes a payment card account number.

6. The proximity information device of claim 1, further comprising:
an antenna embedded in the body and coupled to the RFID IC;
and wherein the RFID IC receives the interrogation signal via the antenna.

7. The proximity information device of claim 6, wherein the interrogation signal provides power for operation of the RFID IC.

8. The proximity information device of claim 6, wherein the antenna is further coupled to a magnetic field detector, the magnetic field detector generating a signal representative of a magnitude of a magnetic component of said interrogation signal.

9. The proximity information device of claim 1, wherein the body is card-shaped.

10. A method comprising:
receiving an interrogation signal at a radio frequency identification (RFID) integrated circuit (IC);
detecting the magnitude of a magnetic field component of said interrogation signal;
detecting the magnitude of an electric field component of said interrogation signal;
determining the a ratio of said electric field component to said magnetic field component; and
transmitting an identification code from the RFID IC if said determining indicates that said ratio exceeds a predetermined threshold.

11. The method of claim 10, wherein said transmitting further comprises:
transmitting an identification code from the RFID IC if said determining indicates that said ratio exceeds a predetermined threshold and if both said magnitude of said electric field component and said magnitude of said magnetic field component exceed expected values.

12. The method of claim 10, wherein said detecting the magnitude of a magnetic field component and said detecting the magnitude of an electric field component are performed using a threshold detector coupled to an antenna of said RFID IC.

13. The method of claim 10, wherein said predetermined threshold is stored in a lookup table of a memory of said RFID IC.

14. The method of claim 11, wherein said expected values are stored in a lookup table of a memory of said RFID IC.

15. The method of claim 12, wherein said threshold detector is coupled to an electric field detector and receives a signal representing a magnitude of a magnetic field measured at an antenna coupled to said RFID IC.

16. The method of claim 10, wherein said RFID IC is mounted on a body of a device.

17. The method of claim 16, wherein said device is at least one of a payment device, an identification device, a medical device, and a training device.

* * * * *